United States Patent [19]

Thomas

[11] Patent Number: 5,660,444
[45] Date of Patent: Aug. 26, 1997

[54] SHOULDER WEBBING RETRACTOR FOR A SAFETY RESTRAINT SYSTEM HAVING A SELF-ZEROING CENTER OF GRAVITY ASSEMBLY

[75] Inventor: Rudy Vorner Thomas, Sterling Heights, Mich.

[73] Assignee: AlliedSignal Inc., Morristown, N.J.

[21] Appl. No.: 579,866

[22] Filed: Dec. 28, 1995

[51] Int. Cl.⁶ .................................................. B60R 21/00
[52] U.S. Cl. ........................ 297/478; 297/483; 297/354.12
[58] Field of Search ................................. 297/477, 478, 297/483, 474, 475, 476, 479, 354.12, 354.1; 242/384.5, 383.4, 384.6, 384

[56] References Cited

U.S. PATENT DOCUMENTS

| | | | |
|---|---|---|---|
| 4,057,200 | 11/1977 | Ubuleata et al. | 242/384.5 X |
| 4,164,337 | 8/1979 | Blom | 297/478 X |
| 4,262,858 | 4/1981 | Takada | 242/384.6 |
| 4,328,934 | 5/1982 | Ahad | 242/384.5 X |
| 4,556,177 | 12/1985 | Kuwakzdo et al. | 242/384.5 X |
| 4,749,231 | 6/1988 | Cremer et al. | 297/483 X |
| 4,760,975 | 8/1988 | Doty | 242/384.5 |
| 4,804,226 | 2/1989 | Schmale | 297/483 X |
| 5,452,941 | 9/1995 | Halse et al. | 297/483 X |

*Primary Examiner*—Milton Nelson, Jr.
*Attorney, Agent, or Firm*—Markell Seitzman

[57] ABSTRACT

A retractor having a frame pivotably mounted to a structural member of the back of a seat of an automotive vehicle. A self-zeroing center of gravity assembly is pivotably mounted to the structural member which maintains a predetermined orientation independent of the angle at which the back of the seat is positioned. A blocker mechanism, responsive to extraction of the shoulder webbing from the retractor to temporarily block the center of gravity assembly from pivoting during the displacement of the back of the seat toward a reclined position and prevents inadvertent locking of the retractor and displacement of the seat's back.

19 Claims, 3 Drawing Sheets

SHOULDER WEBBING RETRACTOR FOR A SAFETY RESTRAINT SYSTEM HAVING A SELF-ZEROING CENTER OF GRAVITY ASSEMBLY

BACKGROUND AND SUMMARY OF THE INVENTION

The invention is related to the field of safety restraint systems for automotive vehicles and, in particular, to a retractor for the shoulder webbing having a self-zeroing center of gravity assembly.

Currently with the advent of reclining seats in automotive vehicles and the shoulder webbing of the safety restraint system still being pivotably attached to the pillar or other stationary structural member of the vehicle, the shoulder webbing of the safety restraint system is not fitted properly to the occupant when the seat is reclined. One solution to this problem is to mount the retractor for the shoulder webbing of the safety restraint system directly on the seat. However, problems are encountered as the back of the seat is displaced from an upright position to a reclined position. First, the shoulder webbing is extracted as the seat is reclined which may cause the retractor to lock up and prohibit the reclining of the seat. Further, the acceleration sensor is now at an angle to the vertical axis of the vehicle resulting in a decrease in is sensitivity.

The object of the invention is a retractor for the shoulder webbing of a safety restraint system mountable to the back of the seat in which the center of gravity assembly incorporating an acceleration (vehicle) sensor is self-zeroing independent of the position of the back of the seat between an upright and reclined position.

Another object of the present invention is to pivotably attach the retractor to a structural member of the back of the seat so that the shoulder webbing will properly fit the occupant independent of the position of the back.

Still another object of the present invention is to provide a mechanism responsive to at least a predetermined length of the shoulder webbing being wound on the spool of the retractor to inhibit the lock-up of the spool.

Yet another object of the present invention is a blocking mechanism responsive to the extraction of shoulder webbing from the retractor's spool to temporarily block the pivoting of the center of gravity assembly in response to the unwinding of the shoulder webbing from the spool.

Accordingly the invention comprises a retractor having a frame mounted to a structural member of the back of the seat and a spool rotatably mounted to the frame having one end of the shoulder belt webbing attached thereto. The retractor includes means attached to one end of the spool for producing a rotary torque tending to wind the shoulder belt webbing on the spool and a ratchet wheel attached to the opposite end.

A center of gravity assembly is attached to the frame and is pivotable about an axis substantially normal to the rotation axis of the spool. The center of gravity assembly has its center of gravity located below the pivot axis such that it remains aligned with the gravitational field independent of the position of the seat back. The center of gravity assembly includes an acceleration sensor producing a mechanical output in response to acceleration greater than a predetermined value.

A lock pawl is pivotably attached to the frame and is displaceable between a disengaged and an engaged position with the ratchet wheel. In the engaged position, the lock pawl prohibits the rotation of the ratchet wheel and of the spool in a direction to unwind the shoulder belt webbing therefrom. A mechanical link responsive to the mechanical output of the acceleration sensor displaces the lock pawl to the engaged position locking the ratchet wheel and the spool in their current position.

In a preferred embodiment of the invention, the retractor is pivotably mounted to the structural member to pivot about an axis transverse to the longitudinal axis of the vehicle so that the shoulder belt webbing will properly fit about the occupant, has a mechanism responsive to the length of the webbing wound on the spool to prevent the lock pawl from engaging the ratchet wheel when a predetermined length of the shoulder webbing is wound on the spool and a blocking mechanism responsive to the unwinding of the shoulder webbing from the spool to temporarily block the pivoting of the center of gravity assembly.

These and other objects of the invention will become more apparent from a reading of the best mode in conjunction with the drawings.

DETAILED DESCRIPTION OF THE DRAWINGS

Figure 1:
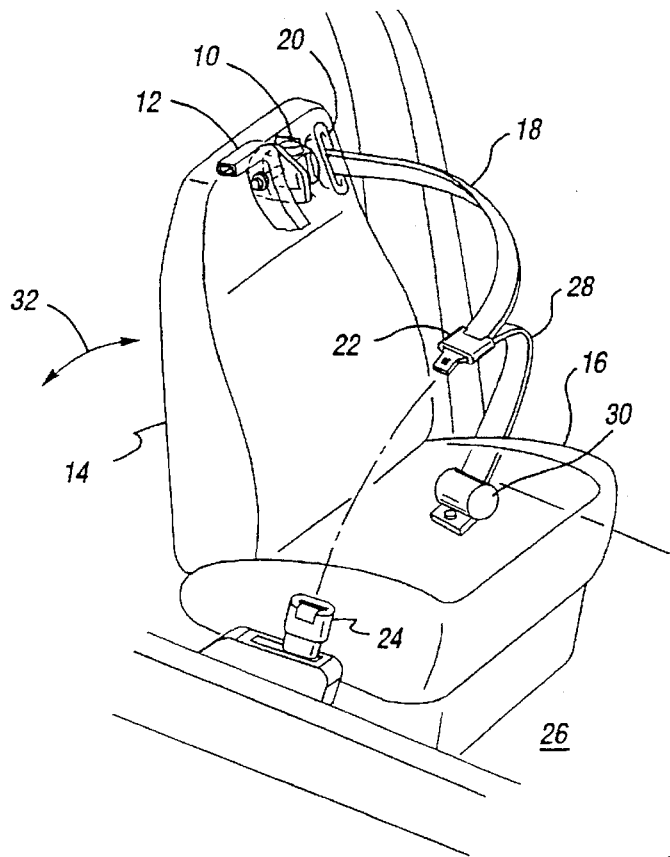
FIG. 1 is a perspective view of a seat in an automotive vehicle incorporating a safety restraint system having a shoulder web retractor according to the invention.
Figure 2:
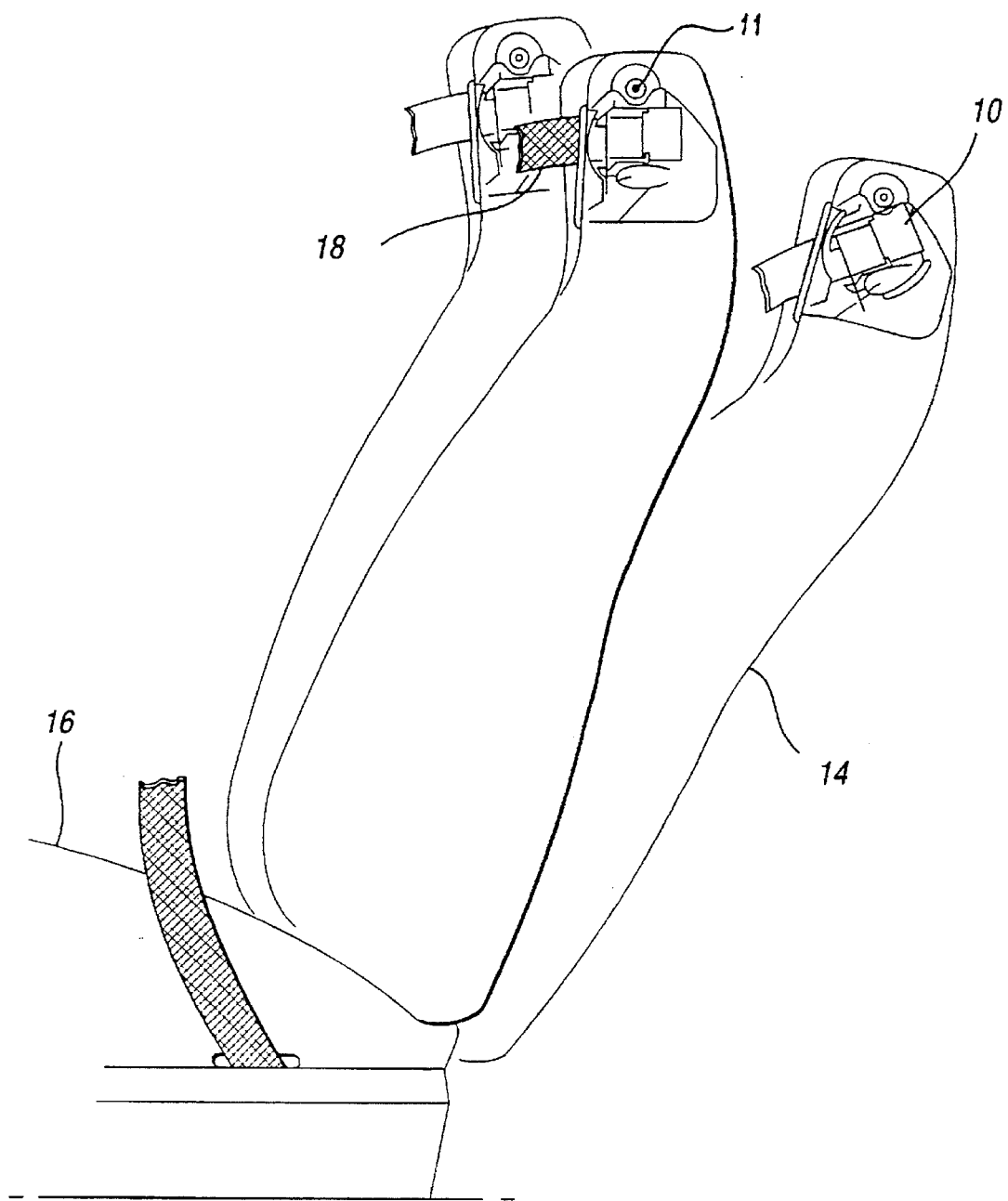
FIG. 2 is a side view of the seat showing the back of the seat in an upright and reclined position.

The environment of the seat belt retractor having a self-zeroing center of gravity assembly is shown in FIGS 1 and 2. As shown in FIG. 1, the seat belt retractor 10 is attached to a structural member 12 of the back 14 of a seat 16 of an automotive vehicle. The shoulder belt webbing 18 exits the back 14 of the seat through a slot 20 and is connected to a tongue 22 lockingly receivable in a buckle 24. The buckle 24 is attached to the floor 26 or other structural member of the seat or the vehicle as is known in the art. The lap webbing 28 has one end connected to the tongue 22 and the opposite end connected to a second retractor 30 of conventional design. As can be appreciated the shoulder belt 18 and lap belt 28 may comprise separate pieces of webbing or one continuous piece. An optional second retractor 30 may also be attached to the floor 26, a structural member of the seat 16 or any other structural member of the vehicle. As is known in the art, the back of the seat may be pivoted backward and forward relative to the seat 16 as indicated by arrow 32.

As shown in FIG. 2, retractor 10 is pivotable about a horizontal axis 11 transverse to the longitudinal axis of the vehicle to accommodate for various angular positions of the back 14 of the seat. As is seen, the location of the shoulder webbing 18 within the slot 20 changes with the angular position of the back 14 to adjust for the back angle and permit correct positioning of the shoulder webbing 18 about the occupant.

Figure 3:
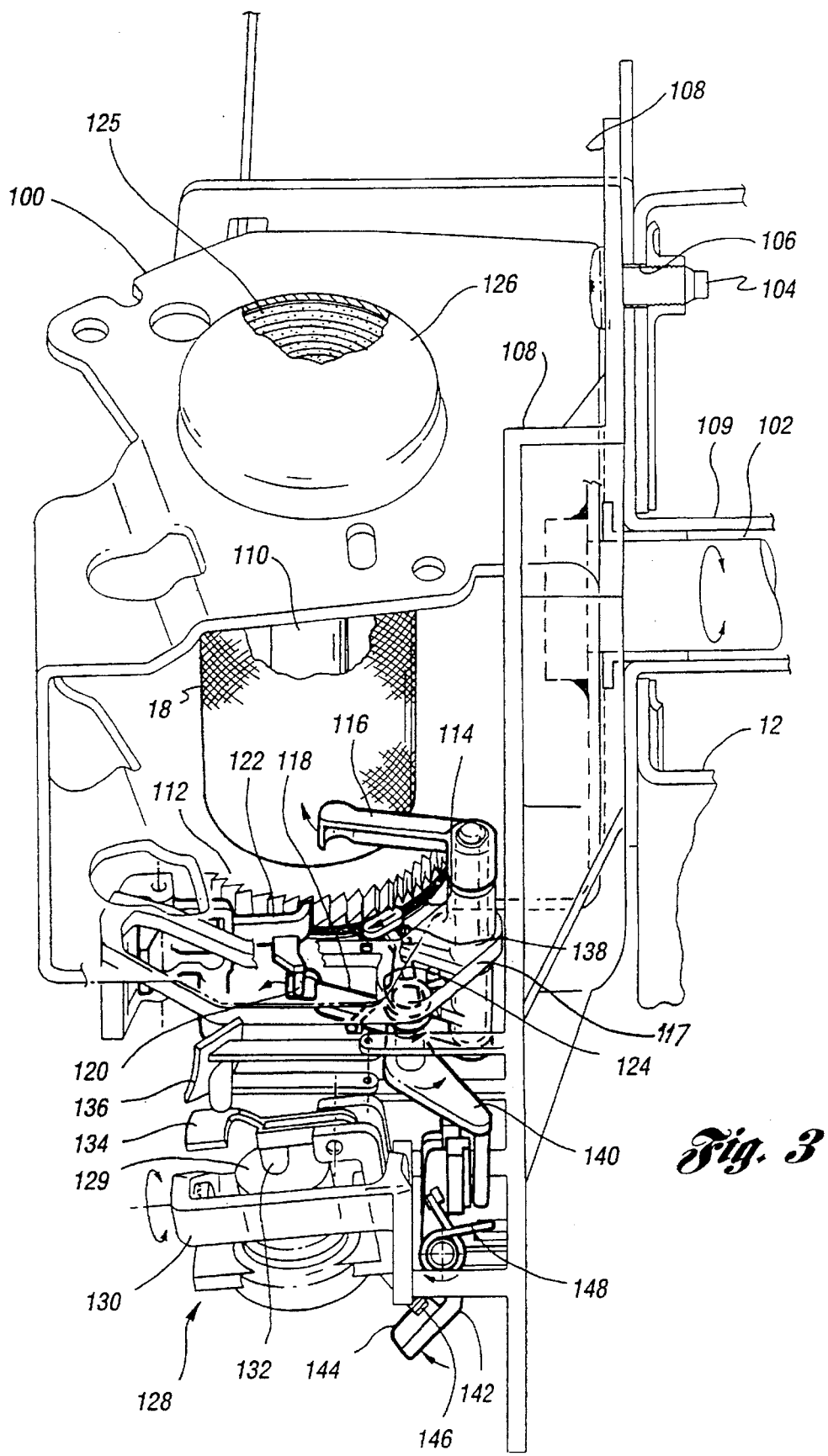
FIG. 3 is a perspective view of the retractor.

FIG. 3 shows the details of the retractor 10 having a variable web-exit angle and a self-zeroing center of gravity assembly. The retractor 10 has a retractor frame 100 attached thereto. The shaft 102 is pivotably mounted to a mounting bracket 108 having a pivot sleeve 109 fixedly attached to the structural member 12 of the back 14 of the seat. A screw 104 attaches a mounting plate 106 to the mounting bracket 108. The screw 104 prevents the mounting plate 106 from rotating relative to the structural member 12 of the back portion of the seat.

The retractor frame 100 is free to pivot relative to the mounting plate 106 and the structural member 12 of the vehicle. The retractor frame 100 rotatably supports a spool 110 on which the shoulder webbing 18 is wound. A ratchet wheel 112 and a clutch plate 114 are attached to one end of the spool 110 and are rotatable therewith. A coil spring 125 enclosed in a spring cap 126 produces a torque tending to wind the shoulder webbing 18 on the spool 110.

A web follower 116 is pivotably attached to a mounting plate 117 which is attached to the retractor frame 100 and rotates a pawl inhibit lever 118 which engages a lift pin 120 on a lock pawl 122. A spring 124 biases the web follower 116 against the shoulder webbing 18 on the spool 110 and the pawl inhibit lever 118 away from the lift pin 120.

In operation, when the seat belt is deployed, the shoulder webbing 18 is extracted from the spool 110 and the web follower 116 displaces the pawl inhibit lever 118 in a direction permitting the lock pawl 122 to engage a tooth on he ratchet wheel 112. However, when the tongue 22 is unlatched from the buckle 24, the shoulder webbing 18 is rewound on the spool 110 by the coil spring 125. With the winding of the webbing 18 on the spool 110, the web follower 116 rotates the pawl inhibit lever 118 in a direction to engage the lift pin 120 preventing the lock pawl 122 from engaging the ratchet wheel 112.

A center of gravity assembly 128 having an acceleration sensor, such as a standing mass (or man) sensor 129, is mounted in a housing 130. The housing 130 is pivotably mounted to the mounting plate 106 and has a pivot axis slightly above the center of gravity assembly 128. In a released state, the center of gravity assembly 12 will align itself vertically due to the force of gravity.

The housing 130 permits the center of gravity assembly to pivot approximately 20°±=degrees. The standing mass sensor 129 is engaged by a first pawl 132 pivotably attached to the mounting plate 106 and is displaceable by the standing mass sensor 129 when a predetermined high rate of acceleration, such as a collision, is encountered. The first pawl 132 has an arcuate surface 134 which is continuously engaged by a second pawl 136 independent of the position of the center of gravity assembly 128. The second pawl 136 is pivotably mounted to the mounting plate 106 and engages the lock pawl 122. As can be appreciated the pawl 132 places a load in the sensor mass 129 to prevent or at least reduce noise and rattling.

In operation, when an acceleration having a value greater than a predetermined value is encountered, the standing mass sensor 129 will produce a mechanical output, i.e. move, displacing the first pawl 132 which, in turn, will displace the second pawl 136. The second pawl, in turn, will displace the lock pawl 122 into engagement with the ratchet wheel 112 prohibiting the ratchet wheel 112 and the spool 110 from rotating in a direction unwinding the shoulder webbing 18 from the spool.

Figure 4:
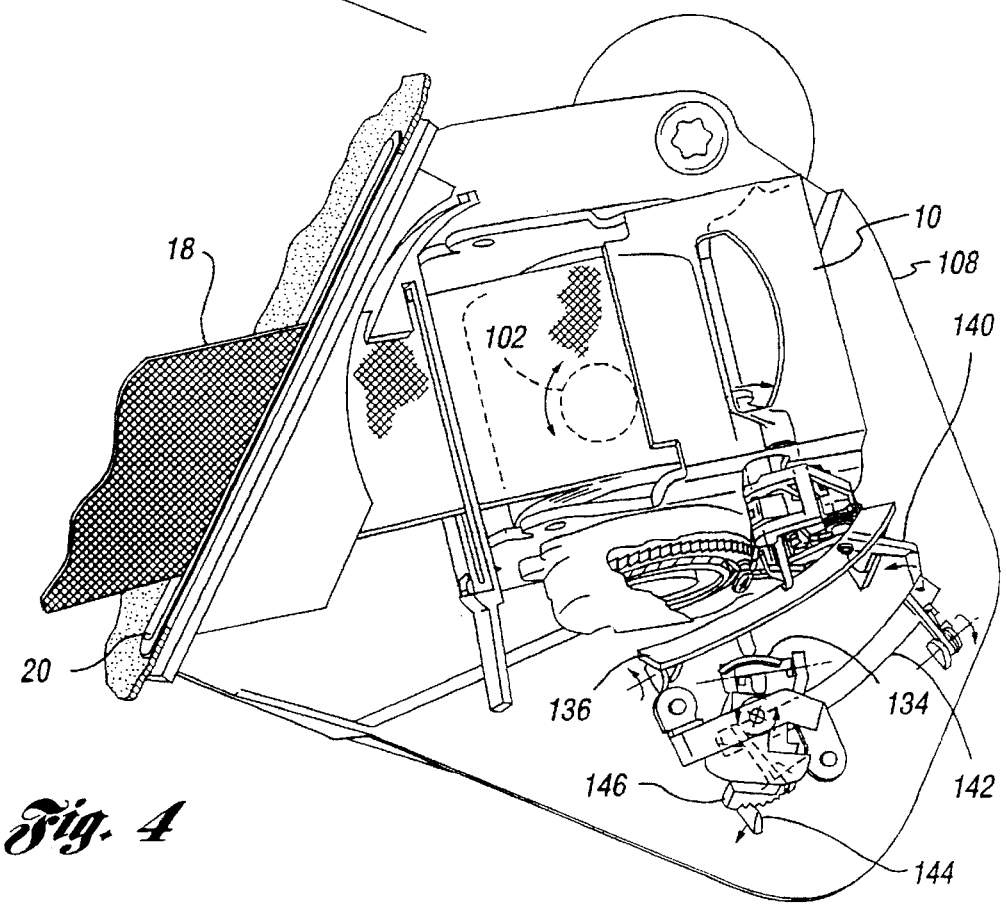
FIG. 4 is a partial side view showing the saw tooth sector.

A clutch spring 138 is received on the clutch plate 114 and is frictionally displaceable therewith. An intermediate lever 140 pivotably mounted to the mounting plate 106 has one end activated by the clutch spring 138. The opposite end engages a blocking lever 142 pivotably attached to the mounting plate 106. A blocking pawl 144 provided at the opposite end of the blocking lever 142 is engagable with saw tooth sector 146 attached to the center of gravity assembly 128 as shown in FIG. 4. A spring 148 biases the blocking pawl 144 into the saw tooth sector 146.

When the seat belt is being deployed or the back 14 is being moved to a reclining position, the webbing 18 will be extracted from the spool 110. The unwinding of the webbing 18 causes the spring clutch 138 to pivot intermediate lever 140 and blocking lever 142 such that the blocking pawl 144 engages the teeth of the saw tooth sector 146 locking the center of gravity assembly 128 relative to the mounting plate 106 as the shoulder web 18 is unwound from the spool. When the unwinding of the shoulder webbing 18 is terminated, the clutch spring 138 displaces the blocking pawl 144 away from the saw tooth sector 146 permitting the center of gravity assembly to zero out. Further, in the event of a rapid deceleration the shoulder of the occupant will produce a force tending to extract the webbing 18 from the spool 110 which also will lock the center of gravity assembly 128 at its current location.

As previously discussed the center of gravity of the center of gravity assembly 128 is below its pivot axis, thus the center of gravity assembly is self-aligning with the field of gravity, independent of the position of the back of the seat. Further, the pivoting of the retractor relative to the back of the seat accommodates the exit axis of the shoulder webbing 18 to pivot and provide a proper fit of the shoulder web to the occupant.

The center of gravity assembly is free move about its axis within a range of approximately 20° plus static lock-up of approximately ±22° and therefore meets the 45° static tilt specification of most U.S. car seats—and dynamic lock-up specification.

While the best mode for carrying out the invention has been described in detail, those familiar with the art to which this invention relates will recognize various alternative designs and embodiments for practicing the invention as defined by the following claims.

We claim:

1. A seat belt retractor adapted to be mounted within a vehicle upon a seat back of a seat the seat back angularly adjustable between various positions, said retractor comprising:

length of shoulder webbing;

a retractor frame adapted to be mounted to a structural member of the back of the seat;

a spool rotatably mounted to said retractor frame having a substantially vertical axis of rotation, said spool attached to one end of the shoulder webbing, the webbing wound about the spool;

means for biasing said spool to rotate in a direction to wind said shoulder webbing on said spool;

a ratchet wheel rotatable with the spool;

a center of gravity assembly pivotable about a pivot axis substantially normal to said vertical axis of rotation of said spool and having a center of gravity located below said pivot axis causing said center of gravity assembly to be self-aligning with the force of gravity independent of the angular position of the retractor, said center of gravity assembly producing a mechanical output in response to an acceleration greater than a predetermined value;

a lock pawl pivotably mounted relative to said retractor frame, said lock pawl displaceable from a first position disengaged from said ratchet wheel to a second position engaging said ratchet wheel to inhibit the rotation of said spool in a direction to unwind the shoulder webbing therefrom;

first means responsive to the mechanical output of said center of gravity assembly for displacing said lock pawl to said second position.

2. The retractor of claim 1 wherein said center of gravity assembly comprises:

a standing mass acceleration sensor for generating said mechanical output in response to said predetermined acceleration;

a sensor housing supporting said standing mass acceleration sensor in a substantially vertical position, said sensor housing pivotable about an axis transverse to the longitudinal axis of the vehicle.

3. The retractor of claim 2 wherein said first means comprises:

a first pawl engaging said standing mass acceleration sensor and displaceable in response to said mechanical output; and a second pawl disposed intermediate said first pawl and said lock pawl and responsive to the displacement of said first pawl to pivot said lock pawl into engagement with said ratchet wheel.

4. The retractor of claim 3 wherein said first pawl has a curved surface engaging said second pawl to compensate for the pivoting of said sensor housing in response to changing the angular position of the back of the seat.

5. The retractor of claim 3 wherein said second pawl has a curved surface engaging said lock pawl independent of the pivoting of said retractor relative to said structural member.

6. The retractor of claim 1 further comprising:

a web follower pivotably attached to the retractor frame, said web follower pivoting in response to the length of the shoulder webbing wound on the spool; and a pawl inhibit lever attached to said web follower and pivotable therewith, said pawl inhibit lever operative to engage said lock pawl and inhibit said lock pawl from engaging said ratchet wheel when a predetermined length of the shoulder webbing is wound on said web spool.

7. The retractor of claim 6 further comprising means for blocking the center of gravity assembly from pivoting in response to the extraction of shoulder webbing from the spool and unblocking the center of gravity assembly in response to retraction of the shoulder webbing on the spool.

8. The retractor of claim 6 wherein the center of gravity assembly includes a housing and wherein a means for blocking comprises:

a saw tooth sector attached to said housing of the center of gravity assembly;

a blocking pawl pivotably and resiliently biased in a direction away from the saw tooth sector and pivotably displaceable to engage said saw tooth sector blocking said center of gravity assembly from pivoting in response to the extraction of said shoulder webbing from said spool;

a clutch member attached to said spool and displaceable in response to the rotation thereof; and an intermediate lever response to the displacement of said clutch member by a rotation of the spool in a direction extracting said shoulder webbing to pivot said blocking pawl into engagement with the saw tooth sector.

9. The retractor of claim 1 further comprises a mounting shaft having one end fixedly attached to said retractor normal to said spool and the other end adapted to be pivotably supported by said structural member permitting said shoulder webbing to exit the retractor at various angles to compensate for the position of the back of the seat and to properly fit about an occupant.

10. A seat belt retractor for use within a vehicle the retractor adapted to be mounted to a seat having a seat back adjustable between various seating positions said retractor comprising:

a length of shoulder webbing;

a retractor frame rotatably mountable about a horizontal axis substantially transverse to the longitudinal axis of the vehicle;

a spool rotatably mounted to said retractor frame, said spool having an axis of rotation normal to said horizontal axis, said spool being attached to one end of the shoulder webbing and the shoulder webbing being windable thereon;

means for biasing said spool to rotate in a direction to wind the shoulder webbing on said spool;

a ratchet wheel rotatable with the spool;

a center of gravity assembly pivotable about a pivot axis substantially parallel to said horizontal axis, and has a center of gravity located below said pivot axis causing said center of gravity assembly to be self-aligning with the force of gravity independent of the position of the retractor, said center of gravity assembly including an acceleration sensor producing a mechanical output in response to an acceleration greater than a predetermined value;

a lock pawl pivotably mounted to said retractor frame, said lock pawl displaceable from a first position displaced from said ratchet wheel to a second position engaging said ratchet wheel inhibiting the rotation of the web spool in a direction unwinding the shoulder webbing from the web spool;

means for displacing said lock pawl to said second position in response to said mechanical output of said acceleration sensor;

a web follower mechanism for inhibiting the displacement of the lock pawl to said second position in response to a predetermined length of the shoulder webbing being wound on the spool; and means for blocking the center of gravity assembly from pivoting in response to the unwinding of the shoulder webbing from the spool and from unblocking the center of gravity assembly in response to the winding of the shoulder webbing on the spool.

11. A seat belt retractor in combination with a seat of a vehicle, the seat comprising a seat back angularly adjustable between various positions, the retractor pivotably mounted to a structural member of the seat back and movable therewith, said retractor comprising:

a length of shoulder webbing;

a retractor frame mounted upon the structural member of the back of the seat;

a spool rotatably mounted to said retractor frame having a substantially vertical axis of rotation, said spool attached to one end of the shoulder webbing, the webbing wound about the spool;

means for biasing said spool to rotate in a direction to wind said shoulder webbing on said spool;

a ratchet wheel rotatable with the spool a center of gravity assembly pivotable about a pivot axis substantially normal to said vertical axis of rotation of said spool and having a center of gravity located below said pivot axis causing said center of gravity assembly to be self-aligning with the force of gravity independent of the angular position of the back of the seat, said center of gravity assembly producing a mechanical output in response to an acceleration greater than a predetermined value;

a lock pawl pivotably mounted relative to said retractor frame, said lock pawl displaceable from a first position disengaged from said ratchet wheel to a second position engaging said ratchet wheel to inhibit the rotation of said spool in a direction to unwind the shoulder webbing therefrom;

first means responsive to the mechanical output of said center of gravity assembly for displacing said lock pawl to said second position.

12. The combination of claim 11 wherein said center of gravity assembly comprises:

a standing mass acceleration sensor for generating said mechanical output in response to said predetermined acceleration;

a sensor housing supporting said standing mass acceleration sensor in a substantially vertical position, said sensor housing pivotably connected relative to the structural member and pivotable about an axis transverse to the longitudinal axis of the vehicle.

13. The combination of claim 12 wherein said first means comprises:

a first pawl engaging said standing mass acceleration sensor and displaceable in response to said mechanical output; and a second pawl disposed intermediate said first pawl and said lock pawl and responsive to the displacement of said first pawl to pivot said lock pawl into engagement with said ratchet wheel.

14. The combination of claim 13 wherein said first pawl has a curved surface engaging said second pawl to compensate for the pivoting of said sensor housing in response to changing the angular position of the back of the seat.

15. The combination of claim 13 wherein said second pawl has a curved surface engaging said lock pawl independent of the pivoting of said retractor relative to the seat.

16. The combination of claim 11 further comprising:

a web follower pivotably attached to the retractor frame, said web follower pivoting in response to the length of the shoulder webbing wound on the spool; and a pawl inhibit lever attached to said web follower and pivotable therewith, said pawl inhibit lever operative to engage said lock pawl and inhibit said lock pawl from engaging said ratchet wheel when a predetermined length of the shoulder webbing is wound on said web spool.

17. The combination of claim 16 further comprising means for blocking the center of gravity assembly from pivoting in response to the extraction of shoulder webbing from the spool and unblocking the center of gravity assembly in response to retraction of the shoulder webbing on the spool.

18. The combination of claim 16 wherein the center of gravity assembly includes a housing and wherein a means for blocking comprises:

a saw tooth sector attached to said housing of the center of gravity assembly;

a blocking pawl pivotably and resiliently biased in a direction away from the saw tooth sector and pivotably displaceable to engage said saw tooth sector blocking said center of gravity assembly from pivoting in response to the extraction of said shoulder webbing from said spool;

a clutch member attacked to said spool and displaceable in response to the rotation thereof; and an intermediate lever response to the displacement of said clutch member by a rotation of the spool in a direction extracting said shoulder webbing to pivot said blocking pawl into engagement with the saw tooth sector.

19. The combination of claim 11 further comprises a mounting shaft having one end fixedly attached to said retractor normal to said spool and the other end adapted to be pivotably supported by the structural member permitting said shoulder webbing to exit the retractor at various angles to compensate for the position of the back of the seat and to properly fit about an occupant.

* * * * *